(12) United States Patent
White, Jr.

(10) Patent No.: US 12,181,996 B2
(45) Date of Patent: Dec. 31, 2024

(54) SENSOR RELIABILITY DETERMINATION

(71) Applicant: Hewlett Packard Enterprise Development LP, Houston, TX (US)

(72) Inventor: Harvey White, Jr., Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 569 days.

(21) Appl. No.: 16/127,608

(22) Filed: Sep. 11, 2018

(65) Prior Publication Data

US 2020/0081813 A1     Mar. 12, 2020

(51) Int. Cl.
*G06F 11/30*     (2006.01)

(52) U.S. Cl.
CPC ...... *G06F 11/3089* (2013.01); *G06F 11/3006* (2013.01)

(58) Field of Classification Search
CPC .......................... G06F 11/3089; G06F 11/3006
See application file for complete search history.

(56) References Cited

U.S. PATENT DOCUMENTS

| | | | |
|---|---|---|---|
| 6,687,637 B2 | 2/2004 | Garabedian | |
| 9,267,862 B1 | 2/2016 | Kavars et al. | |
| 9,514,636 B2 | 12/2016 | Modi et al. | |
| 9,535,808 B2 | 1/2017 | Bates et al. | |
| 10,223,403 B2 * | 3/2019 | Malhotra | G06F 16/2365 |
| 10,372,569 B2 * | 8/2019 | Premerlani | H04L 67/12 |
| 2005/0203697 A1 * | 9/2005 | Dalgleish | G08G 1/01 |
| | | | 701/117 |
| 2013/0002477 A1 * | 1/2013 | Dehnie | G01S 19/215 |
| | | | 342/357.3 |
| 2014/0351642 A1 * | 11/2014 | Bates | G06F 11/0709 |
| | | | 714/26 |
| 2015/0006115 A1 * | 1/2015 | Svoboda | G01D 3/08 |
| | | | 702/190 |
| 2019/0011283 A1 * | 1/2019 | Soutar | G01D 4/004 |
| 2020/0074828 A1 * | 3/2020 | Mousavi | G08B 27/00 |
| 2020/0327009 A1 * | 10/2020 | Callison | H04Q 9/04 |
| 2021/0173757 A1 * | 6/2021 | O'Donnell | G06F 11/3075 |

FOREIGN PATENT DOCUMENTS

JP          5437328 B2 *   3/2014
WO     WO-2016190856      12/2016

OTHER PUBLICATIONS

Söllinger et al., "Non-reference image quality assessment and natural scene statistics to counter biometric sensor spoofing", Mar. 9, 2018, IET Biometrics 2018, vol. 7, iss. 4, pp. 314-324; ISSN 2047-4938 (Year: 2018).*

Fawzy A. et al., Outliers Detection and Classification in Wireless Sensor Networks, (Research Paper), Egyptian Informatics Journal, Jul. 2013, pp. 157-164, vol. 14, No. 2.

* cited by examiner

*Primary Examiner* — Mi'schita' Henson
(74) *Attorney, Agent, or Firm* — Hewlett Packard Enterprise Patent Department

(57) ABSTRACT

Examples include receiving a plurality of values of a parameter that is measured by a sensor, determining a sensor rate of change based on the plurality of values, determining a sensor error rate based on the plurality of values, receiving a reading of the parameter, and determining a reliability of the reading based on the sensor rate of change and the sensor error rate.

22 Claims, 4 Drawing Sheets

SENSOR RELIABILITY DETERMINATION

BACKGROUND

Enterprises may utilize specific physical processes (manufacturing, baking, etc.) that rely on specific conditions for accurate deployment of the physical processes. Accordingly, enterprises may use sensors linked to control systems to monitor and control these physical processes. These control systems and sensors may allow an enterprise to automate the monitoring and/or operation of the physical processes.

BRIEF DESCRIPTION OF THE DRAWINGS

The following detailed description references the drawings, wherein.

DETAILED DESCRIPTION

Figure 1:
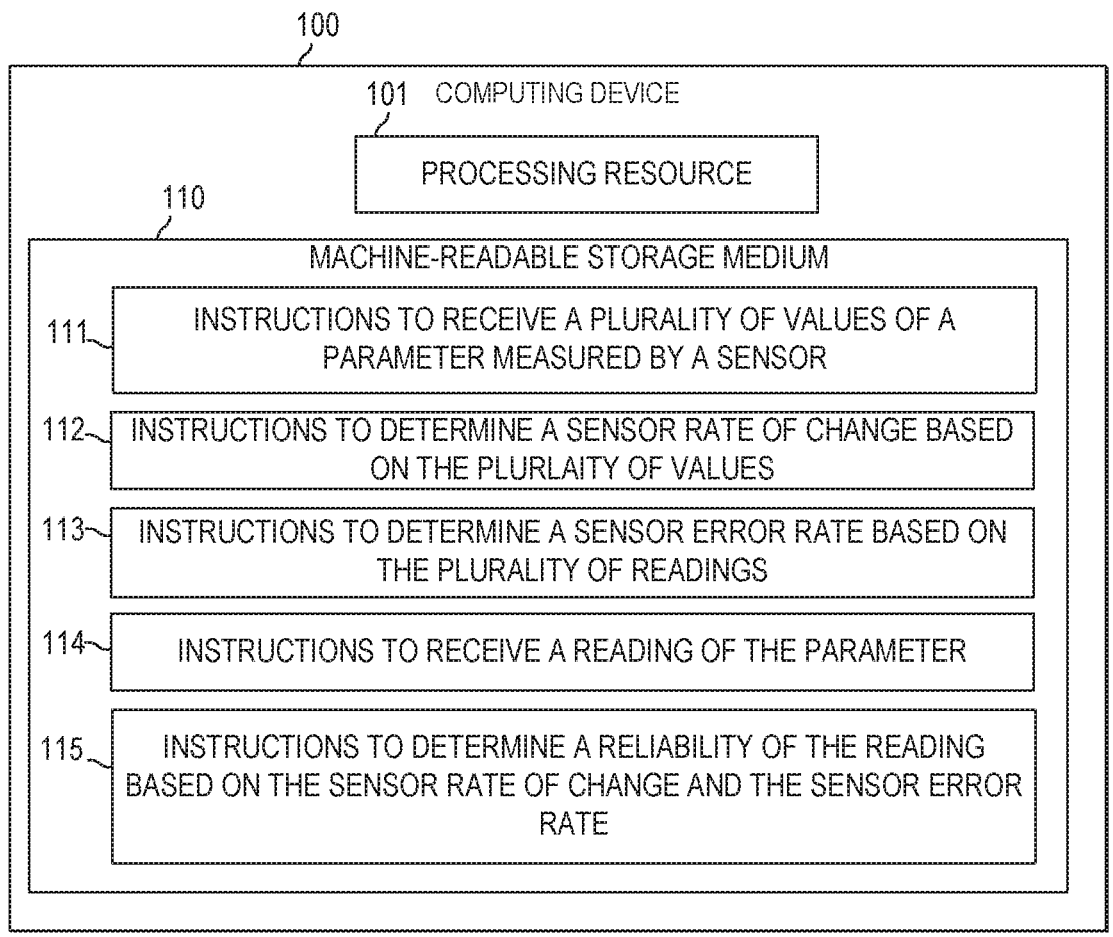
FIG. 1 is a block diagram of a computing device to determine a reliability of reading from a sensor, according to some examples.

A physical process may include a chemical, electrical, and/or mechanical process that takes raw material input and transforms the raw materials into a different output. A physical process may use sensors to monitor the process in order to ensure that the physical process occurs accurately. In some examples, sensors deployed in these physical processes are simple. For example, a sensor that monitors temperature may be a thermocouple. A thermocouple may be comprised of two different types of wires that are joined together to sense the temperature. With simple sensors such as these, there may not be enough processing computer power and/or real estate to add fault detection and/or security features directly on the sensor. Accordingly, in the event a sensor fails, the physical processes may not function properly.

Thus, there is a need to ensure that the readings obtained from the sensors are accurate. For example, a control system should be able to detect when a sensor is malfunctioning and giving erroneous readings.

Additionally, there is also a need to ensure that the readings obtained by the control system are actually being provided by the sensor. For example, the reading from the sensor may be spoofed such that the readings are not representative of the true state of the parameter that the sensor is measuring. However, these spoofed readings may be sophisticated enough (i.e., not be so abnormal) such that they are not recognizable as being spoofed readings. In these situations, the system may continue to operate as though it were receiving the actual readings (instead of spoofed readings).

Physical restrictions to the access of the hardware (sensor, wiring, etc.) are used to provide security. But these systems cannot provide a determination when a sensor reading may be spoofed.

Examples herein address these technological problems by providing a way to determine a reliability of a sensor reading. In some examples, a sensor signature is learned based on a plurality of data points of the parameter that the sensor is supposed to measure. These data points may include actual readings from the sensor or pre-set values from a pre-set data. The sensor signature may include a sensor error rate and a sensor rate of change. The sensor error rate provides an expected error rate for the sensor when there is no alteration to the sensor data (e.g., via spoofing, physical malfunction, etc.) The sensor rate of change provides an expected rate of change from one reading to the next reading when there is no alteration to the sensor data. Using this sensor signature, the reliability of a reading from the sensor may be determined. In some examples, a reading error rate based on the reading is determined. The reading error rate describes an actual error rate of the sensor. The reading error rate is compared to the sensor error rate to determine a reliability of the reading. In some examples, a reading rate of change is determined based on the reading. The reading rate of change describes an actual rate of change for the sensor. The reading rate of change is compared to the sensor rate of change to determine a reliability of the reading.

Accordingly, the methods and systems described herein provide a way of analyzing the sensor data that provides a more detailed view of the expected sensor data. This may cover situations where there is a rouge sensor (e.g., an unauthorized device sending false sensor data), a malfunctioning sensor (e.g., a sensor component is broken), an altered environment (e.g., the environment of the sensor is altered to provide false readings), etc.

In some examples, a computing device is provided with a non-transitory machine-readable storage medium. The non-transitory machine-readable storage medium includes instructions, that when executed, cause a processing resource to receive a plurality of values of a parameter measured by a sensor. The storage medium also includes instructions, that when executed, cause the processing resource to determine a sensor rate of change based on the plurality of values and determine a sensor error rate based on the plurality of values. Additionally, the instructions, when executed, cause the processing resource to receive a current value of the parameter and determine a reliability of the current value based on the sensor rate of change and the sensor error rate.

In some examples, a method comprises receiving a plurality of values related to a parameter measured by a sensor and determining a sensor signature based on the values. The sensor signature may comprise a sensor rate of change. The method also comprises, receiving a plurality of readings of the parameter from the sensor and determining a reliability of a first reading from the plurality of readings based on a comparison of the first reading to the sensor signature. The steps of the method are performed by a processing resource.

In some examples, a computing device comprises an input engine, a signature engine, an analysis engine and an action engine. The input engine is to receive a first plurality of readings of a parameter measured by a sensor and to receive a second plurality of readings of the parameter. The signature engine is to determine a sensor error rate and a sensor rate of change from the first plurality of readings. The analysis is to determine a reliability of a current reading from the second plurality of readings based on the sensor error rate and the sensor rate of change. The action engine is to determine an action based on the determination of reliability.

Referring now to the figures, FIG. 1 is a block diagram of a computing device 100 to determine a reliability of a reading from a sensor. As used herein, a computing device may include a server, a networking device, a chipset, a desktop computer, a workstation, a mobile phone, a tablet, an electronic reader, or any other processing device or equipment. In some examples, computing device 100 may be an edge computing device that is part of a network. The network may comprise many portions (i.e., local area networks) that are connected to each other via a broader network (e.g., the Internet). These portions may be at different physical locations. The network may also comprise a core center where an enterprise owner of the network may situate many of its computing device with higher processing power. In some examples, the edge computing device may be located at a portion of a network that is not the core and is at the branches. As used herein, an edge computing device may be a computing device that is situated locally in relation to the sensor from which it is analyzing. This is discussed in relation to FIG. 3.

Computing device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, 113, 114, and 115 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to computing device 200 in FIG. 2. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, and 115 as described herein.

Instructions 111 may be executable by processing resource 101 to receive a plurality of values of a parameter. The parameter may be what is measured by a sensor. The sensor may be a device that measures a parameter in the environment surrounding the sensor and/or factors in the system to which the sensor is plugged in. For example, the sensor may measure temperature, pressure, current, power, etc. In some examples, the sensor may be an industrial sensor. As used herein, an industrial sensor is a sensor that may be used in manufacturing systems, processing systems, chemical refining systems, etc.

In some examples, the plurality of values of the parameter may be provided by pre-set data. The pre-set data may represent the physical processing system (in which the sensor operates) in specific operating modes. For example, the pre-set data may represent the physical processing system in normal operating mode. Accordingly, this pre-set data may include readings that represent the values the sensor would expect to read if the system it was measuring in was running in normal operating conditions (e.g., day-to-day operations). As another example, the pre-set data may represent the physical processing system in abnormal mode. Accordingly, this pre-set data may include readings that represent the values the sensor would expect to read the system it was measuring in was running in abnormal operations (e.g., plant maintenance mode). In some examples, the values are not from a pre-set data but are data from historical values that were read by the sensor. Accordingly, this data set may include readings that have been read by the sensor in the past.

In some examples, each value in the plurality of value is associated with a specific time. For example, the sensor may be configured to sample the parameter at a specific time interval. Accordingly, the time period between each value in the plurality of values is the same as the sampling rate. In other examples, the sensor may not be configured to sample at a specific time interval, but on command. In these examples, each value in the plurality of values is tied to a specific point in time, allowing computing device 100 to understand the time sequence of the values.

Additionally, the plurality of values may comprise values indicating error. For example, a temperature sensor in a house may normally measure 70 degrees F. Once in a while, it may measure an erroneous value, such as ERR, 0, 1, etc., and then return to giving a non-erroneous value. This erroneous value may indicate that the sensor cannot determine a value for the parameter. That reading is considered a value, but it is a value that indicates error. While specific examples have been given for error, other values may be used. In examples where a pre-set data is used, the error values in the plurality of values may reflect the expected number of expected error values for that specific operating mode.

Instructions 112 may be executable by processing resource 101 to determine a sensor rate of change based on the plurality of values (received at 111). As used herein, a sensor rate of change represents the threshold change between one reading of the parameter to an adjacent reading of the parameter. In some examples, the threshold may include a maximum threshold. In some examples, the threshold may include a minimum threshold. As is described later, the threshold value of the sensor rate of change allows computing device 100 to understand when a sensor is not acting like it should be.

To determine the sensor rate of change, instructions 112 may be executable by processing resource 101 to determine change coefficients that describes how fast the value of the parameter value changes from one reading to the next adjacent-in-time reading. For example, if there are five values of the parameter (V1 at time T1, V2 at time T2, V3 at time T3, V4 at time T4, and V5 at time T5), instructions 112 may be executed to determine a rate of change between adjacent-in-time values. Thus, a coefficient C1 is determined for the values V1 and V2, a coefficient C2 is determined for the values V2 and V3, a coefficient C3 is determined for the values V3 and V4, and a coefficient C4 is determined for the values V4 and V5. For example, the coefficient C1 may be determined via the equation V2−V1/T2−T1.

One or a combination of these coefficients may be characterized as the sensor rate of change. In some examples, the sensor rate of change may be set as the coefficient with the highest value. This may represent the fastest rate of change. In some examples, the sensor rate of change may be set as the coefficient with the lowest value. This may represent the slowest rate of change. In yet other examples, the sensor rate of change may be set as the average of all the coefficients. In some examples, the sensor rate of change may comprise more than one rates. For example, it may include a minimum threshold and a maximum threshold.

Instructions 113 may be executable by processing resource 101 to determine a sensor error rate based on the plurality of values. As previously discussed, the plurality of values received by instructions 111 may include values that indicate an error reading. A sensor that is operating as it should may occasionally give a reading that is an error, but still be operating normally. Accordingly, the sensor error rate may be determined by determining the percentage of error readings in the plurality of values. Thus, as used herein, a sensor error rate indicates a frequency of error readings that should be expected for the sensor in a particular operating mode. For example, if the plurality of values comprises five non-erroneous values and one error value, the sensor error rate is ⅙. In some examples, the sensor error rate may include more than one sensor error rate. For example, there may be a sensor error rate for different operating modes. A sensor error rate for normal operating mode may be different from a sensor error rate for plant maintenance mode. Depending on which mode the sensor is operating in (if known), different sensor error rates may be used.

Instructions 114 may be executable by processing resource 101 to receive a reading of the parameter. As used herein, a reading of the parameter may be a value that is actually measured by the sensor (rather than from a value from a pre-set data). The reading may be associated to a specific time point. In some examples, the reading may be one that is measured after the sensor rate of change and/or the sensor error rate is initially determined. It is a reading measured by the sensor while the sensor is actually operating and thus, a reading with unknown reliability.

In some examples, computing device 100 may receive the plurality of values and determine a sensor rate of change and a sensor error rate during an initial "learning" phase of the computing device 100. During this phase, the computing device 100 may learn the expected change rate(s) and error rate(s) of the sensor are. These rates may initially capture expected operating environments and conditions of which the sensor will operate. The reading may then be received after the initial learning phase of computing device 100, while the sensor is in operation. The reading may be part of multiple readings that are received when the sensor is operation. Accordingly, in some examples, instructions 114 may include instructions that are executable by processing resource to receive a plurality of readings of the parameter from the sensor. Each reading received is associated with a specific time point such that sequential readings are identifiable.

In some examples, the reading may be in the same form as the plurality of values. For example, in situations where the plurality of values is analog, the reading may also be in analog form. In some examples, the reading may be in a different form as the plurality of values.

Instructions 115 may be executable by processing resource 101 to determine a reliability of the reading. The reliability determination may be based on the sensor rate of change and the sensor error rate. A reliability determination may determine whether the reading is valid or invalid.

In some examples, instructions 115 may include instructions that are executable by processing resource 101 to determine a reading rate of change. As used herein, a reading rate of change may comprise a number that represents the change of the parameter from the current reading to the previous reading. For example, if there were three readings received R1 at T1, R2 at T2, and R3 at T3 by computing device 100 (via execution of instructions 114), the reading rate of change for R2 may be determined via R2−R1/T2−T1, the reading rate of change for R3 may be determined via R3−R2/T3−T2, etc.

The reliability of the reading may be then determined via a comparison of the reading rate of change to the sensor rate of change (determined by execution of instructions 112). In examples where the sensor rate of change comprises a maximum threshold, a determination that the reading rate of change is higher than the maximum threshold leads to a reliability determination that the reading is invalid. In examples where the sensor rate of change comprises a minimum threshold, a determination that the reading rate of change is lower than the minimum threshold leads to a reliability determination that the reading is invalid. In examples where the sensor rate of change comprises two sensor rates of change (e.g., a maximum and a minimum), a determination that the reading rate of change outside the range set by the minimum and the maximum leads to a reliability determination that the reading is invalid. In examples where the sensor rate of change comprises an average, as discussed above, a determination that the reading rate of change is below or above that average by a set value leads to a reliability determination that the reading is invalid. The set value may be verified and set by an administrator of sensor.

In some examples, instructions 115 may include instructions that are executable by processing resource 101 to determine a reading error rate. As used herein, a reading error rate may comprise a number that represents the error percentage of a set group of readings that includes the current reading. The set group may be determined by a specific time interval or a specific number of readings. For example, the reading error rate may be determined after every 100 readings are received. As another example, the reading error rate may be determined after a specific time interval (e.g., 1 minute, 2 minutes, etc.) As yet another example, the reading error rate may be determined using the current reading and a set of the previous readings. For example, if the current reading is R10, the reading error rate may be determined using R1, R2, R3, R3, R4, R5, R6, R7, R8, and R9. In this example, the set of previous readings would be 9. Similarly, the reading error rate for reading R11 would be determined using R2, R3, R4, R5, R6, R7, R8, R9, and R10. As compared to the sensor error rate, the reading error rate reflects an error rate that the sensor is currently experiencing while the sensor error rate reflects an expected error rate for the sensor.

The reliability of the reading may be then determined via a comparison of the reading error rate to the sensor error rate (determined by execution of instructions 113). For example, a determination that the reading error rate is below or under a set value from the sensor error rate leads to a reliability determination that the reading is invalid. This may be characterized as a deviation. The set value may be determined by an administrator of the sensor. For example, if the sensor error rate is 20% (meaning that every one out of five readings are errors), the reading error rate is 25%, and the set value is 6%, then the reading would be determined as valid because it is within the set value of the sensor error rate. If, on the other hand, the set value is 3%, then the reading would be determined as invalid because the reading error rate is outside the set value of the sensor error rate.

In some examples, the reading may be determined to be invalid based on a determination that at least one of the sensor rate of change and the sensor error rate. In other words, a reading is determined to be invalid even though a reading error rate may be within the confines of the sensor error rate but the rate of change for the reading may be outside the confines of the sensor rate of change, or vice versa.

The usage of a sensor error rate and a sensor rate of change allows computing system 100 to identify whether a sensor is operating incorrectly. Additionally, the reliance on the sensor error rate and the sensor rate of change allows computing device 100 to determine whether the reading is one that is actually be sent by the sensor or one that is being sent by a rogue device trying to imitate the sensor (e.g., spoofing). Accordingly, as compared to systems that use a maximum reading as a comparison, the systems and methods described herein allow for a more accurate detection. For example, systems that rely on value thresholds (i.e. a range of values for which the sensor should be reading), may only be able to identify when a sensor is not operating correctly. However, when the rouge device is trying to spoof the sensor, the bad actor may use numbers that are within the sensor value range of the parameter. This would be undetectable to systems that only rely on ranges to determine validity of the sensor. Using the sensor rate of change and the sensor error rate allows a level of detail that may make it difficult to spoof.

In some examples, computing device 100 may also include instructions that are executable by processing resource 101 to transmit a signal to a second computing device based on a determination that the reading is invalid. In some examples, the signal may be a flag to indicate to a user of the sensor that it is not operating as it should be. The flag may draw the user's attention to the sensor so that the sensor may be investigated further. In some examples, the signal may be to affect a change in the physical processing system in which the sensor monitors. For example, the signal may indicate to the second computing device that the physical processing system should be altered or halted. In some examples, the second computing device may be a computing device that is in a different physical location that is further away from the sensor.

In some examples, the signal may be a command to a different device (e.g., a valve, etc.), to automatically alter the system's physical process based on a determination that the reading is invalid.

The sensor may be an analog or digital sensor. In examples where it is analog, the values received by computing device 100 are analog values and the instructions stored in machine-readable storage medium 110 may also include instructions to convert the analog values to digital values. The conversion of the plurality of values may be done before the determination of the sensor rate of change and the sensor error rate. The conversion for the reading may be done before the determination of reliability of the reading.

Figure 2:
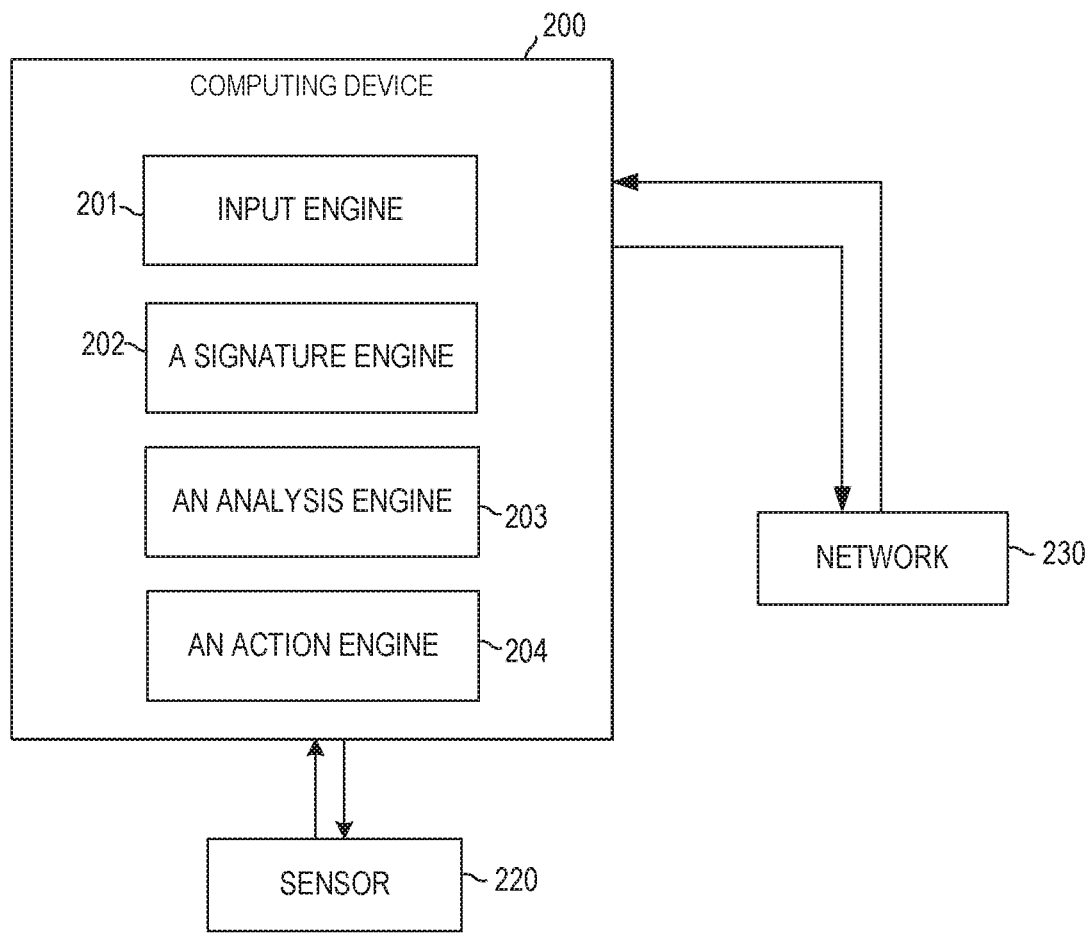
FIG. 2 is a block diagram of a computing device interacting with a network and a sensor to determine a reliability of a reading from the sensor and to transmit the reliability determination to the network, according to some examples.
Figure 3:
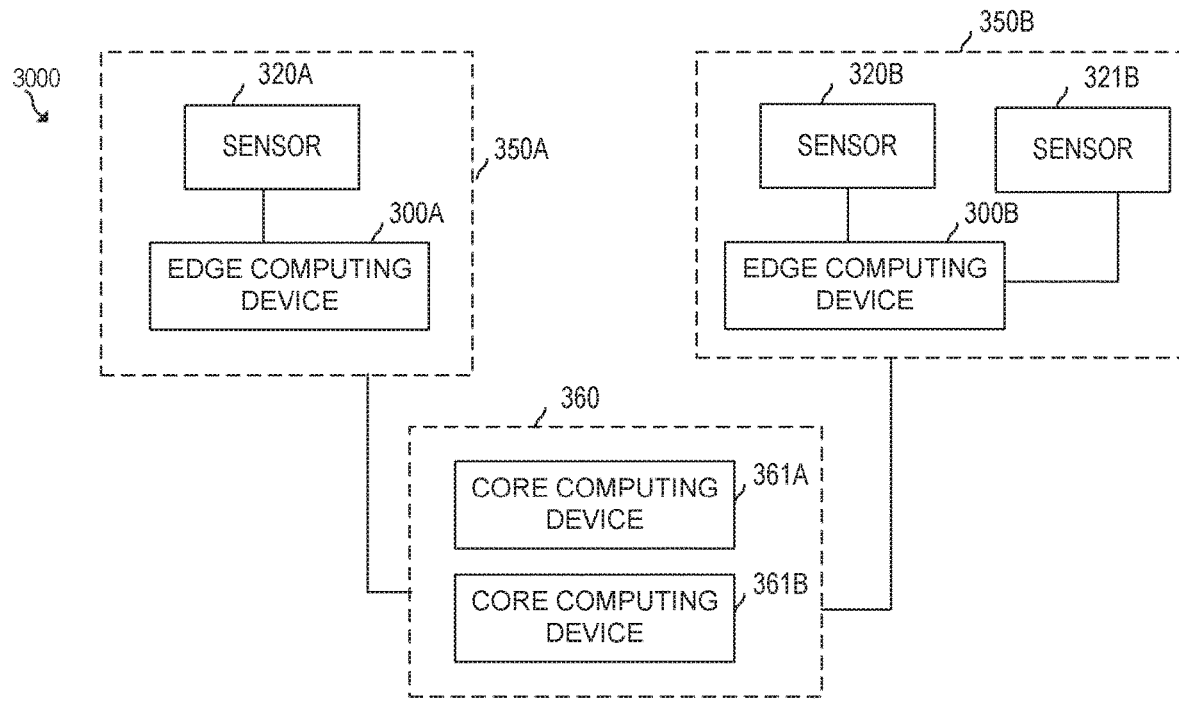
FIG. 3 is a network comprising of multiple locations, with the determination of a reliability reading in an edge computing device, according to some examples.

Computing device 100, which is described in terms of instructions and processing resource, may include aspects of computing device 200 of FIG. 2 or edge computing devices 300A-300C of FIG. 3.

FIG. 2 shows a block diagram of a computing device 200 connected to a sensor 220 and a network 230. The network 230 may include a plurality of computing devices. In some examples, computing device 200 may be located closer in proximity to sensor 220 than other computing devices in network 230. Accordingly, computing device 200 may be characterized as an edge computing device. Computing device 200 comprises an input engine 201, signature engine 202, an analysis engine 203, and an action engine 204.

Each of engines 201, 202, 203, 204, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines.

Each engine of a computing device 200 can include at least one machine-readable storage mediums (for example, more than one) and at least one computer processor (for example, more than one). For example, software that provides the functionality of engines on networking device can be stored on a memory of the switch 200 to be executed by a processor of the computing device 200.

Input engine 201 allows computing device 200 to receive a first plurality of readings of a parameter. The parameter is measured by a sensor. Input engine 201 also allows computing device 200 to receive a second plurality of readings of the parameter. In some examples, the first plurality of readings may be received before the second plurality of readings. For example, the first plurality of readings may be actually read by the sensor during a first time span and the second plurality of readings may be actually read by the sensor during a second time span that is after the first time span.

In some examples, the first plurality of readings may span many different operating modes of the physical processing system. As discussed above, the physical processing system may operate in different modes with different conditions (e.g., day-to-day mode, re-boot mode, maintenance mode, etc.). The environmental conditions may be extremely different from one mode compared to another mode. Accordingly, in some examples, the first plurality of readings may capture the physical processing system in a variety of different modes.

The signature engine 202 allows computing device 200 to determine a sensor error rate and a sensor rate of change based on the first plurality of readings. The sensor error rate and the sensor rate of change, as described above, are applicable here. In some examples, and as discussed above, the sensor rate of change may comprise multiple sensor rates of change and the sensor error rate may comprise multiple sensor error rates.

The sensor rate of change and the sensor error rate may be characterized as a sensor signature.

The analysis engine 203 allows computing device 200 to determine a reliability of a first reading from the plurality of readings based on the sensor error rate and the sensor rate of change. As used herein, a "first" is used to signal out a specific reading and does not correlate to the order in which the readings are received in the second plurality of readings. For example, a "first" reading may be the third reading received, a $1000^{th}$ reading received, etc.

In some examples, analysis engine 203 may allow computing device 200 to determine a rate of change for the first reading based on the second plurality of readings. For example, the first reading may be V2 at time point T7. The reading rate of change may be determined by comparing the value at T7 to the value of time T6 (the most adjacent time period to T7). If the value at time T6 is V1, then the reading rate of change for reading V2 may be determined as V2−V1/T7−T6. The analysis engine 203 may determine a reliability of the first reading by comparing the reading rate of change to the sensor rate of change. Based on a determination that the reading rate of change is not within the confines of the sensor rate of change (e.g., higher than a maximum threshold, lower than a minimum threshold, too far away from the average, etc.), analysis engine 203 may determine that the reading is invalid.

In some examples, analysis engine 203 may allow computing device 200 to determine an error rate for the first reading based on the second plurality of readings. The reading error rate for the first reading may be based on a set of readings in the second plurality of readings. In some examples, the set of readings may comprise all readings in the second plurality of readings that were received prior to the first reading. For example, if the first reading is the $100^{th}$ reading received in the second plurality of readings, the error rate may be determined by looking at readings 1 through 100 and determining how many of those readings indicate a sensor error. If there are 5 error readings, than the reading error rate for the first reading is 5/100. The error reading for the reading after reading $100^{th}$ is determined by looking at readings 1 through 101 and determining how many of those readings indicate a sensor error. If there are 5 error readings, than the reading error rate for the first reading is 5/101.

In some examples, the set of readings may comprise some but not all of the readings in the second plurality of readings that were received prior to the first reading. The number in the set may be configured such that it represents an accurate sample.

The analysis engine 203 may determine a reliability of the first reading by comparing the reading error rate to the sensor error rate. Based on a determination that the reading error rate is not within the confines of the sensor error rate (e.g., too far away, etc.), analysis engine 203 may determine that the reading is invalid.

As discussed above, analysis engine 203 may determine that the first reading is invalid based on either the error rates or the rates of change. In other words, either the reading error rate or the reading rate of change being out of the confines of their respective sensor counterparts may lead to a determination that the first reading is invalid. Both do not have to be out of the confines to lead to a determination that the first reading is invalid.

Action engine 204 allows computing device 200 to determine an action based on the determination of reliability by analysis engine 203. For example, based on a determination that the first reading is invalid, action engine 204 may determine that a signal should be sent to a second computing device in network 230. The signal may flag to the user of sensor that a more detailed analysis on the sensor should be performed. In other words, the signal may indicate to the user that the sensor is being spoofed. As another example, based on a determination that the first reading is invalid, action engine 204 may send a signal to a control portion in that is part of the physical process system sensor 220 is measuring. The control portion may comprise an actuator, a flow control component (e.g., valve), etc. The control portion may change the operation of the system (e.g., shut off the system, change the operation mode, etc.). In some examples, computing device 200 may interact with multiple sensors 220 (not shown). In these examples, computing device 200 may determine a reliability of readings from each sensor as described above in relation to sensor 220.

Additionally, computing device 200 may update the sensor rate of change and the sensor error rate based on additional readings that are received by input engine 201. After an initial sensor error rate of change and an initial sensor error rate is determined, input engine 201 may receive additional readings (apart from the second plurality of readings), and signature engine 202 may allow computing device 200 to continuously update the sensor signature based on data that is received after the first plurality of readings. Accordingly, this allows computing device 200 to be dynamic and revise the sensor signature as needed.

In some examples, signature engine 202 may determine a maximum sensor threshold and a minimum sensor threshold based on the first plurality of readings. The maximum sensor threshold represents the maximum value for the reading that should be received by the sensor. The minimum sensor threshold represents the minimum value for the reading that should be received by the sensor. These thresholds may be determined by looking at the values of the first plurality of readings and determining the maximum value and the minimum value. These combined may be considered as a sensor range.

In examples where signature engine 202 determines a maximum sensor threshold and a minimum sensor threshold, analysis engine 203 may additionally determine a reliability of the readings in the second plurality of readings based on a comparison the reading value and the maximum sensor value and the minimum sensor value. Based on a determination that the reading value is higher than the maximum sensor value or lower than the minimum sensor value, analysis engine 203 may determine that the reading is invalid. Accordingly, action engine 204 may determine an action based on this reliability determination, as described above in relation to action engine 204.

While example of FIG. 2 is described with respect to a first reading in the second plurality of readings, analysis engine 203 may also determine a validity of other readings in the second plurality of readings.

Computing device 200, which is described in terms of engines comprising hardware and software, may include aspects of computing device 100 of FIG. 1 or edge computing devices 300A and 300B of FIG. 3.

FIG. 3 shows a block diagram of a network 3000 spanning multiple physical portions. In some examples, portions 350A, 350B, and 360 may be located at different physical sites of an enterprise. In these examples, portions 350A and 350B may be characterized as branches and portion 360 may be characterized as a core. Core 360 may be located at a headquarter of the enterprise that runs network 3000 and branches 350A and 350B may represent other sites of the enterprise.

In other examples, portions 350A, 350B, and 360 may be in the same physical site. For example, if the enterprise that controls the network 3000 is a chemical processing company, the portions may be at a plant of the company. Portion 360 may be a control center and portions 350A and 350B may be located where the chemical is being processed (in the cooling towers, mixing chambers, etc.).

Portion 350A comprises sensor 320A and edge computing device 300A Portion 350B comprises sensor 320B, sensor 321B, and edge computing device 300B. Portion 350 comprises core computing device 361A and 361B.

In some examples, portion 360 may have more computing processing power than portions 350A and 350B. For example, portion 360 comprises core computing devices 361A and 361B which may have processing resources (CPU, etc.) with more capability (e.g. based on speed or quantity) than edge computing devices 300A and 300B.

Sensors 320A, 320B, and 321B may measure parameters of the environment of portions 350A and 350B. In some examples, sensors 320A, 320B, and 321B may measure different parameters or the same parameter. For example, if network 3000 is in a chemical processing plant, sensor 320A may measure flow rate of liquid a tank, sensor 320B may measure flow rate of liquid in a second tank, and sensor 321B may measure temperature in the second tank.

Edge computing device 300A and edge computing device 300B may comprise similar components as discussed in relation to the engines of FIG. 2. Thus, accordingly, edge computing device 350A may receive a plurality of readings with regard to the parameter that is measured by sensor 320A, determine a sensor signature with respect to sensor 320A, determine a validity of the readings of sensor 320A, and determine an action based on the validity determination.

Similarly, edge computing device 300B may do the same for the parameters read by sensor 320B and sensor 321B. Different actions may be determined for the readings of sensor 320B and sensor 321B. For example, based on a determination that a reading of sensor 320B is invalid, edge computing device 300B's action engine may determine that a signal to portion 360 should be sent such that a user may understand that sensor 320B needs to be monitored closely. But, based on a determination that a reading of sensor 321B is invalid, edge computing device 300B's action engine may determine that a signal to another physical component of the processing plant, e.g. a valve that is in the second tank, in order to change the operation of the system that the sensor 321B is measuring. This is because the parameter measured by sensor 321B may have less room for error than the parameter measured by sensor 320B. Additionally, edge computing device 300B may also send a signal to portion 360 to flag to the user based on the determination that the reading from sensor 321B is invalid. Accordingly, in some examples, action engine 204 may determine that more than one actions should be done based on the reliability determination.

Thus, portions 350A and 350B may communicate to 360 such that portion 360 is aware of readings from sensors 320B and 321B that are determined to be invalid.

In the example of network 3000, edge computing devices 300A and 300B are characterized as edge computing devices because they are close in proximity to sensor 320A. Accordingly, instead of having to send the readings to core computing devices 361A and 361B, which are further away, the determination of reliability of the readings from sensors 320A, 320B, and 321B may be done at edge computing devices 300A and 300B. This requires less consumption of network traffic and decreased probability that an invalid reading will be missed due to network traffic issues (e.g., dropped packets, etc.) The form of signals outputted by sensors 320A, 320B, and 321B are analog. Accordingly, input engines of edge computing devices 300A and 300B may also allow edge computing devices 300A and 300B to convert analog form to digital form.

Network 3000 may include aspects of computing device 100 of FIG. 1 or computing device of FIG. 2. For example, edge computing devices 300A and 300B may comprise the engines as described in relation to FIG. 2 or the instructions, storage-medium, and processing resource as described in relation to FIG. 1.

Figure 4:
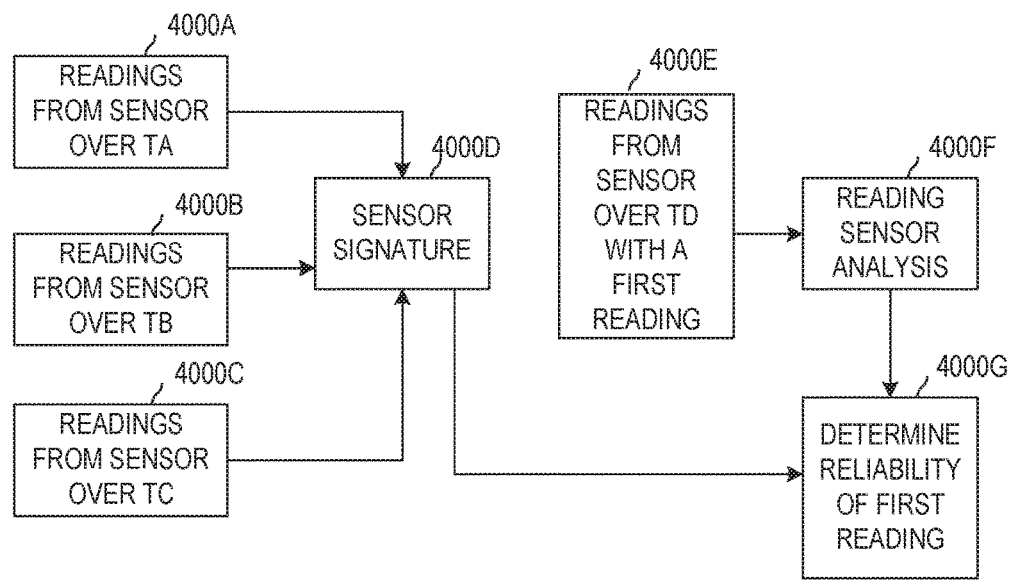
FIG. 4 is a conceptual diagram of a generation of a sensor signature and the determination of a reliability reading based on the sensor signature, according to some examples.

FIG. 4 is a diagram of a generation of a sensor signature from a plurality of readings from a sensor over different time periods. Whole FIG. 4 is described in relation to computing device 200 of FIG. 2, the concepts described in FIG. 4 may also be applicable to computing device 100 of FIG. 1, and edge computing devices 300A and 300B of FIG. 3

Input engine 201 may receive readings 4000A, 4000B, and 4000C from sensor 220. Specifically readings 4000A may span over a time period of TA, readings 4000B may span over a time period of TB, and readings 4000C may span over a time period of TC. In some examples, the time periods TA, TB, and TC may be different lengths from each other. In other examples, the time periods TA, TB, and TC may be the same lengths as each other.

In some examples, the time periods TA, TB, and TC may be a continuous time sampling. In other examples, the time periods TA. TB, and TC may be a combination of segmented time spans. For example, TA may comprise a sampling from 10:00 AM to 12:00 PM and a sampling from 4:00 PM to 8:00 PM, and TB may comprise a sampling from 12:01 PM to 3:59 PM.

In any of these examples, the time periods may correlate to different operating modes of the physical processing system in which sensor 220 is placed. For example, TA may cover a mode where the system is performing day-to-day operations, TB may cover a mode where the system is performing maintenance operations, and TC may cover a mode where the system is performing restart operations. Accordingly, computing device 200 may understand the numbers to expect during different operating modes. Thus, when the readings 4000A, 4000B, and 4000C are communicated to input engine 201, they are communicated in such a way that allows input engine 201 to match the different modes to the different time periods. For example, the information may be inputted by a user in a second computing device in network 230, which is communicated to computing device 200. In some examples, the beginnings and ending of the time periods TA, TB, and TC may be determined based on user input. For example, based upon the input engine 201 receiving an input that day-to-day operations is going to start, input engine 201 may indicate any readings received after that as associated with TA. Additionally, based upon the input engine 201 receiving an input that maintenance operations is going to start, input engine may indicate any readings received after as not being associated with TA, but with TB.

Based on readings 4000A, 4000B, and 4000C, signature engine 202 determines a sensor signature 4000D. The sensor signature may comprise at least one sensor error rate and at least one sensor rate of change. In some examples, the sensor signature may comprise at least three sensor error rates and at least three sensor rates of change to correlate to the different time periods TA, TB, and TC. In these examples, the analysis engine 203 may determine which one to use based on a known current operating mode the sensor is in. That way analysis engine 203 may use the appropriate sensor error rate and sensor rate of change when determining a reliability of a current reading. Accordingly, the different sensor rates and sensor error rates may be stored in a manner that allows computing device 200 to correlate it to the operating modes of TA, TB, and TC.

In other examples, the sensor signature 4000D may be comprised of one sensor rate of change and one sensor error rate. In these examples, a separate sensor rate of change and sensor error rate is determined for each time period TA, TB, and TC but then the values are averaged.

Input engine 201 may receive readings 4000E from the sensor 220 over a time period TD. Readings 4000E may comprise a first reading. Time period TD may comprise a time period that occurs after time periods TA, TB, and TC and is a time period in which the a user of computing device 200 wishes to determine a reliability of the readings. This time period may be a period when the system is in actual operation.

Using readings 4000E, analysis engine 203 may determine a rate of change and an error rate for a first reading. As discussed above, the first reading may be any reading that is within the readings 4000E and may or may not correlate with the order in which the readings are received. In FIG. 4, this is represented by box 4000F as reading sensor analysis.

Accordingly, based on the analysis 4000F and the sensor signature 4000D, analysis engine 203 may determine a reliability 4000G of the first reading. As discussed above in relation to the discussion of sensor signature 4000D, in some examples, the sensor signature 4000D may comprise different sensor error rates and sensor rates of change for the different time periods TA, TB, and TC. Accordingly, in these examples, analysis engine 203 may also receive a signal that indicates to it which mode the system is operating in. For example, if the system is performing day-to-day operations, and the time period TA covered day-to-day operations, then analysis engine 4000G may determine a reliability of the first reading using the sensor error rate and the sensor rate of change that corresponds to TA.

The signal may be communicated to computing device 200 by a second computing device in network 230. For example, a user sitting at a computing device in a control center in network 230 may indicate that the system is supposed to be operating day-to-day mode. Accordingly, that computing device may send that signal to computing device 200. Analysis engine 203 may allow computing device 200 to receive that signal and determine the most accurate sensor error rate and sensor rate of change in the sensor signature.

The concept shown in FIG. 4 may include other concepts as described in relation to FIG. 1, FIG. 2, and/or FIG. 3. For example, the sensor signature 4000D may include a maximum sensor value and a minimum sensor value, as described in FIG. 2. In some examples, a separate maximum sensor value may be determined for each readings 4000A, 4000B, and 4000C and a separate minimum sensor value may be determined for each readings 4000A, 4000B, and 4000C.

Figure 5:
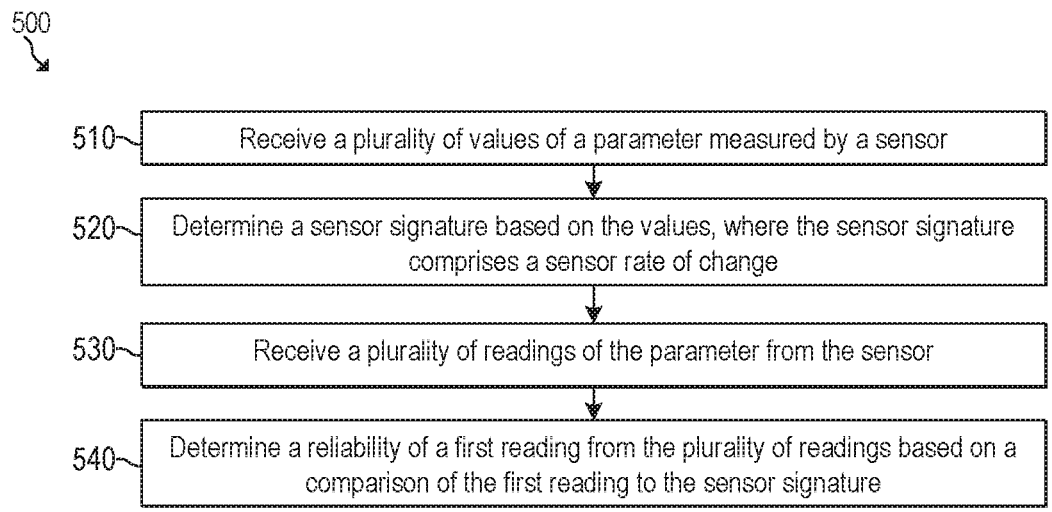
FIG. 5 is a block diagram of a flowchart of determining a reliability of a sensor reading, according to some examples.

FIG. 5 is a block diagram of a flowchart of determining a reliability of a sensor reading, according to some examples. Although execution of method 500 is described below with reference to computing device 100, other suitable devices for execution of method 500 may be used (e.g., computing device 200 of FIG. 2, edge computing device 300A and edge computing device 300B of FIG. 3, etc.).

At 510, instructions 111 may receive a plurality of values related to a parameter measured by a sensor. At 520, instructions 112 may determine a sensor signature based on the plurality of values. The sensor signature may comprise a sensor rate of change. Additionally, not shown, the sensor signature may comprise a sensor error rate.

At 530, instructions 113 may receive a plurality of readings of the parameter from the sensor. The plurality of readings may be received after the plurality of values. The plurality of readings may comprise a first reading.

At 540, instructions 114 may determine a reliability of the first reading from the plurality of readings. The determination of reliability may be based on a comparison of the first reading to the sensor signature. As used herein, the usage of the first reading may include using numbers that is determined based on the first reading. For example, a rate of change for the first reading may be characterized as using the first reading. Accordingly, the determination of reliability may be based on a comparison of the first reading rate of change to the sensor signature. As another example, an error rate for the first reading may be characterized as using the first reading. Accordingly, the determination of reliability may be based on a comparison of the first reading error rate to the sensor signature. In some examples, functionalities described herein in relation to FIG. 5 may be provided in combination with functionalities described herein in relation to any of FIGS. 1-4.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium for determining whether or not a sensor has been spoofed in a computing environment, the sensor measuring a plurality of values in the computing environment, the machine-readable storage medium comprising instructions, that, when executed, cause a processing resource to:
   receive the plurality of values associated with a parameter measured by the sensor;
   determine a sensor rate of change based on the plurality of values, wherein the sensor rate of change is a change in coefficient values between one reading of the parameter and an adjacent-in-time reading of the parameter;
   determine a sensor error rate based on the plurality of values, wherein the sensor error rate comprises a frequency of error readings expected from the sensor rate of change absent the sensor being spoofed;
   receive, from the sensor, a reading of the parameter; and
   determine that the sensor has been spoofed when the reading of the parameter from the sensor corresponds with the sensor rate of change and not the sensor error rate.

2. The non-transitory machine-readable storage medium of claim 1, comprising instructions, that when executed, further cause the processing resource to:
   determine a reading rate of change based on the reading, wherein the determination of whether or not the sensor has been spoofed is based on a comparison of the sensor rate of change and the reading rate of change.

3. The non-transitory machine-readable storage medium of claim 1, comprising instructions, that when executed, further cause the processing resource to:
  determine a reading error rate based on the reading; and
  determine a deviation of the reading error rate from the sensor error rate, wherein the determination of whether or not the sensor has been spoofed is based on the deviation.

4. The non-transitory machine-readable storage medium of claim 1, comprising instructions, that when executed, further cause the processing resource to:
  determine a sensor range based on the plurality of values, wherein whether or not the sensor has been spoofed is based on a comparison of the sensor range and the reading.

5. The non-transitory machine-readable storage medium of claim 1, wherein the determination indicates that the sensor is spoofed; and
  wherein the machine-readable storage medium comprises instructions, that when executed, further cause the processing resource to send a flag in response to the determination.

6. The non-transitory machine-readable storage medium of claim 1, wherein the sensor is an industrial sensor.

7. The non-transitory machine-readable storage medium of claim 1, wherein the reading is an analog signal, the received plurality of values associated with the parameter measured by the sensor, are associated with a first time interval, and the received reading of the parameter is associated with a second time interval.

8. The non-transitory machine-readable storage medium of claim 1, wherein the plurality of values are analog signals.

9. The non-transitory machine-readable storage medium of claim 1, wherein the change in coefficient values describe how fast a value of the parameter changes from a first reading of the parameter to a next adjacent-in-time reading of the parameter.

10. The non-transitory machine-readable storage medium of claim 9, wherein determining the sensor rate of change based on the plurality of values, the processing resource further to:
  determining an average value of a plurality of change coefficients between the plurality of values using the first reading and the next adjacent-in-time reading of the parameter; and
  comparing the average value of the plurality of change coefficients with a threshold value.

11. The non-transitory machine-readable storage medium of claim 1, wherein the sensor rate of change is an expected rate of change from a first reading to a second reading when there is no alteration to sensor data via spoofing of the sensor.

12. A method for determining whether or not a sensor has been spoofed in a computing environment, the sensor measuring a plurality of values in the computing environment, the machine-readable storage medium comprising:
  receiving, by a processing resource, the plurality of values associated with a parameter measured by the sensor;
  determining, by the processing resource, a sensor signature based on the plurality of values, wherein the sensor signature comprises a sensor rate of change, and wherein the sensor rate of change is a change in coefficient values between one reading of the parameter and an adjacent-in-time reading of the parameter;
  determine a sensor error rate based on the plurality of values, wherein the sensor error rate comprises a frequency of error readings expected from the sensor rate of change absent the sensor being spoofed;
  receiving, by the processing resource, a plurality of readings of the parameter from the sensor; and
  determining, by the processing resource, that the sensor has been spoofed when the plurality of readings correspond with the first reading to the sensor signature and not the sensor error rate.

13. The method of claim 12, wherein the determination of whether or not the sensor has been spoofed indicates that the sensor has been spoofed, and
  wherein the method further comprises sending, by the processing resource, an error signal to a core computing device.

14. The method of claim 12, wherein the processing resource is a processing resource of an edge computing device.

15. The method of claim 12, wherein the determining whether or not the sensor has been spoofed further comprises:
  determining, by the processing resource, a reading rate of change based on the plurality of readings; and
  comparing, by the processing resource, the reading rate of change to the sensor rate of change.

16. The method of claim 12, further comprising:
  determining, by the processing resource, a reading error rate from the plurality of readings; and
  comparing, by the processing resource, the reading error rate to the sensor error rate.

17. A computing device for determining whether or not a sensor has been spoofed in a computing environment, the sensor measuring a plurality of readings of a sensor parameter in the computing environment, the computing device comprising:
  a memory storing instructions;
  a processor communicatively coupled to the memory and configured to execute the instructions;
  an input engine to receive a first plurality of readings of the sensor parameter and to receive a second plurality of readings of the sensor parameter;
  a signature engine to determine a sensor error rate and a sensor rate of change from the first plurality of readings, wherein the sensor rate of change is a change in coefficient values between one reading of the parameter and an adjacent-in-time reading of the parameter, and wherein the sensor error rate comprises a frequency of error readings expected from the sensor rate of change absent the sensor being spoofed;
  an analysis engine to determine that the sensor has been spoofed from the second plurality of readings when the reading of the parameter from the sensor corresponds with the sensor rate of change and not the sensor error rate; and
  an action engine to determine an action based on the determination that the sensor has been spoofed.

18. The computing device of claim 17,
  wherein the analysis engine is to determine a reading error rate based on the second plurality of readings, and
  wherein the determination is based on a comparison of the reading error rate and the sensor error rate.

19. The computing device of claim 17,
  wherein the analysis engine is to determine a reading rate of change based on the second plurality of readings, and
  wherein the determination is based on a comparison of the reading rate of change and the sensor rate of change.

20. The computing device of claim 17, wherein the computing device is an edge computing device.

21. The computing device of claim 20, wherein the second plurality of readings comprise an analog reading.

22. The computing device of claim 17,
wherein the determination indicates that the sensor is spoofed, and
wherein the action determined comprises sending a signal.

* * * * *